(12) United States Patent
Taylor

(10) Patent No.: US 7,036,370 B1
(45) Date of Patent: May 2, 2006

(54) SPRING ASSEMBLY WITH CANTILEVERED SPRING RODS

(75) Inventor: Julian S. Taylor, Oklahoma City, OK (US)

(73) Assignee: Taylor Innovations, L.L.C., Oklahoma City, OK (US)

( * ) Notice: Subject to any disclaimer, the term of this patent is extended or adjusted under 35 U.S.C. 154(b) by 0 days.

(21) Appl. No.: 10/974,221

(22) Filed: Oct. 27, 2004

Related U.S. Application Data

(63) Continuation-in-part of application No. 10/741,614, filed on Dec. 19, 2003, now Pat. No. 6,889,547.

(51) Int. Cl.
*G01F 23/00* (2006.01)

(52) U.S. Cl. .......................... 73/296; 73/299

(58) Field of Classification Search ............... 73/296, 73/299, 715; 33/717, 719; 200/83 R; 116/227
See application file for complete search history.

(56) References Cited

U.S. PATENT DOCUMENTS

| | | | |
|---|---|---|---|
| 3,358,098 A | 12/1967 | Hill | 200/83 R |
| 3,412,609 A | 11/1968 | Kaletka et al. | 73/308 |
| 3,956,934 A | 5/1976 | White | 73/323 |
| 4,373,388 A | 2/1983 | Kitamura et al. | 73/301 |
| 4,536,918 A | 8/1985 | Brockhaus | 16/308 |
| 4,548,390 A | 10/1985 | Sasaki | 267/91 |
| 4,657,231 A | 4/1987 | Surletta | 267/107 |
| 4,796,469 A | 1/1989 | Brown et al. | 73/49.2 |
| 4,800,678 A | 1/1989 | Loos | 49/394 |
| 4,988,978 A | 1/1991 | Soto | 340/624 |
| 5,170,659 A | 12/1992 | Kemp | 73/46 |
| 5,273,455 A | 12/1993 | MacLellan | 439/387 |

(Continued)

OTHER PUBLICATIONS

"685 Liquid Level Indicator for Atmospheric Vessels," WellMark Series 6851, pp. 1-2, Sec. 1.1, The WellMark Company, L.L.C., Oklahoma City, OK.

(Continued)

*Primary Examiner*—Hezron Williams
*Assistant Examiner*—Tamiko Bellamy
(74) *Attorney, Agent, or Firm*—Fellers, Snider, et al.

(57) ABSTRACT

A spring assembly and an apparatus incorporating the same. The spring assembly includes a base block configured to be rigidly fixed to a frame. A pair of nominally identical spring rods is cantilevered from the base block in a first direction. Each rod has a length, a proximal end rigidly fixed to the base and a free distal end. The distal ends are configured to engage a linkage member to resist movement of the linkage member by axial deflection of said rods away from the first direction. The spring rods are each preferably characterized as substantially cylindrical in shape and formed from steel or other suitable spring material. A fulcrum preferably provides support to an intermediary portion of the spring assembly to adjust the spring force range. The spring assembly is preferably utilized in a liquid level indicator to indicate a height of a column of liquid in a vessel.

19 Claims, 9 Drawing Sheets

U.S. PATENT DOCUMENTS

| | | | |
|---|---|---|---|
| 5,354,041 A | 10/1994 | Edwards | 267/277 |
| 5,900,546 A | 5/1999 | Wilkins | 73/290 V |
| 6,125,017 A | 9/2000 | Misso et al. | 360/265.1 |
| 6,260,414 B1 | 7/2001 | Brown et al. | 73/295 |
| 6,415,725 B1 | 7/2002 | Yoshikazu | 112/237 |
| 6,435,026 B1 | 8/2002 | Donehue | 73/314 |

OTHER PUBLICATIONS

"685 Multiswitch Liquid Level Indicator for Atmospheric Vessels," WellMark Series 685M, pp. 5-6, Sec. 13, The WellMark Company, L.L.C., Oklahoma City, OK.

"685S Liquid Level Indicator for Atmospheric Vessels," pp. 68-69, Major Controls, Inc.

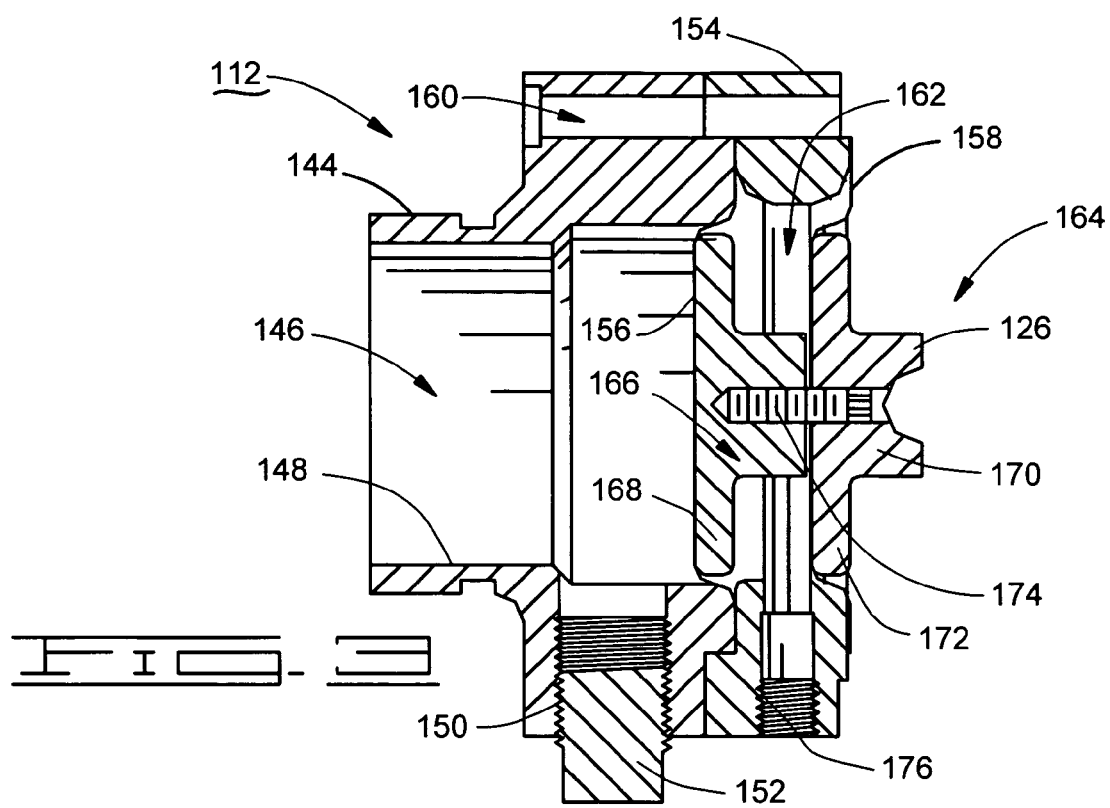
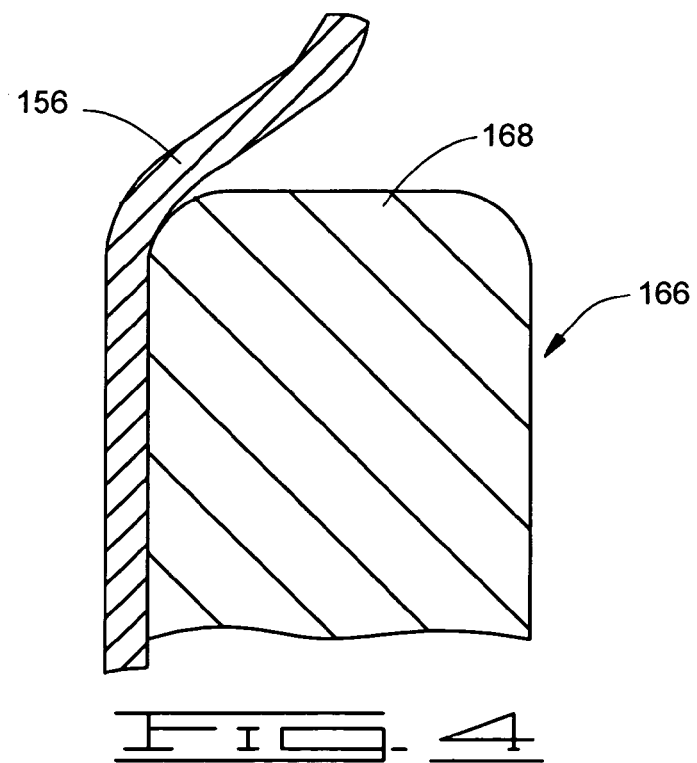

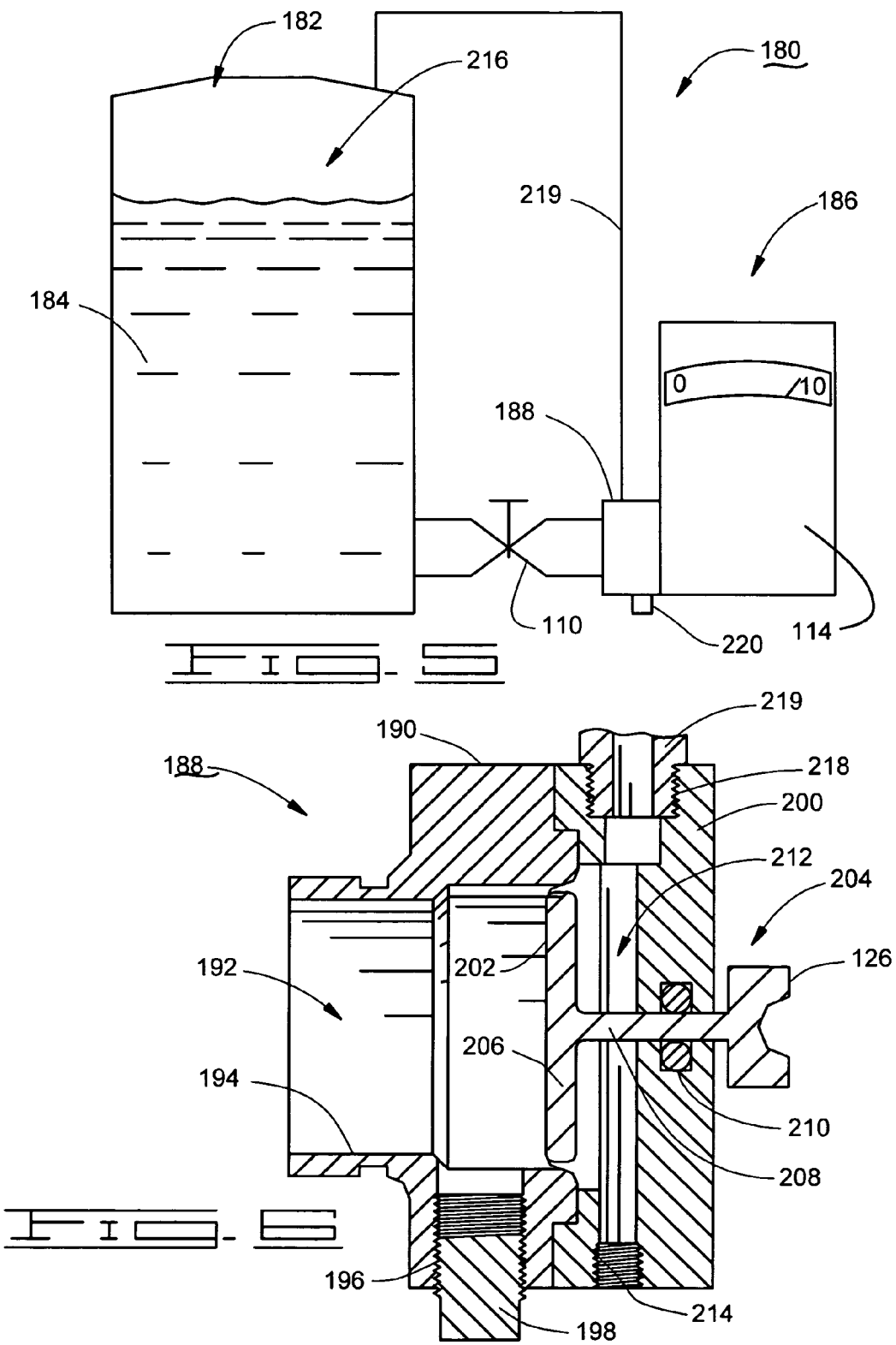

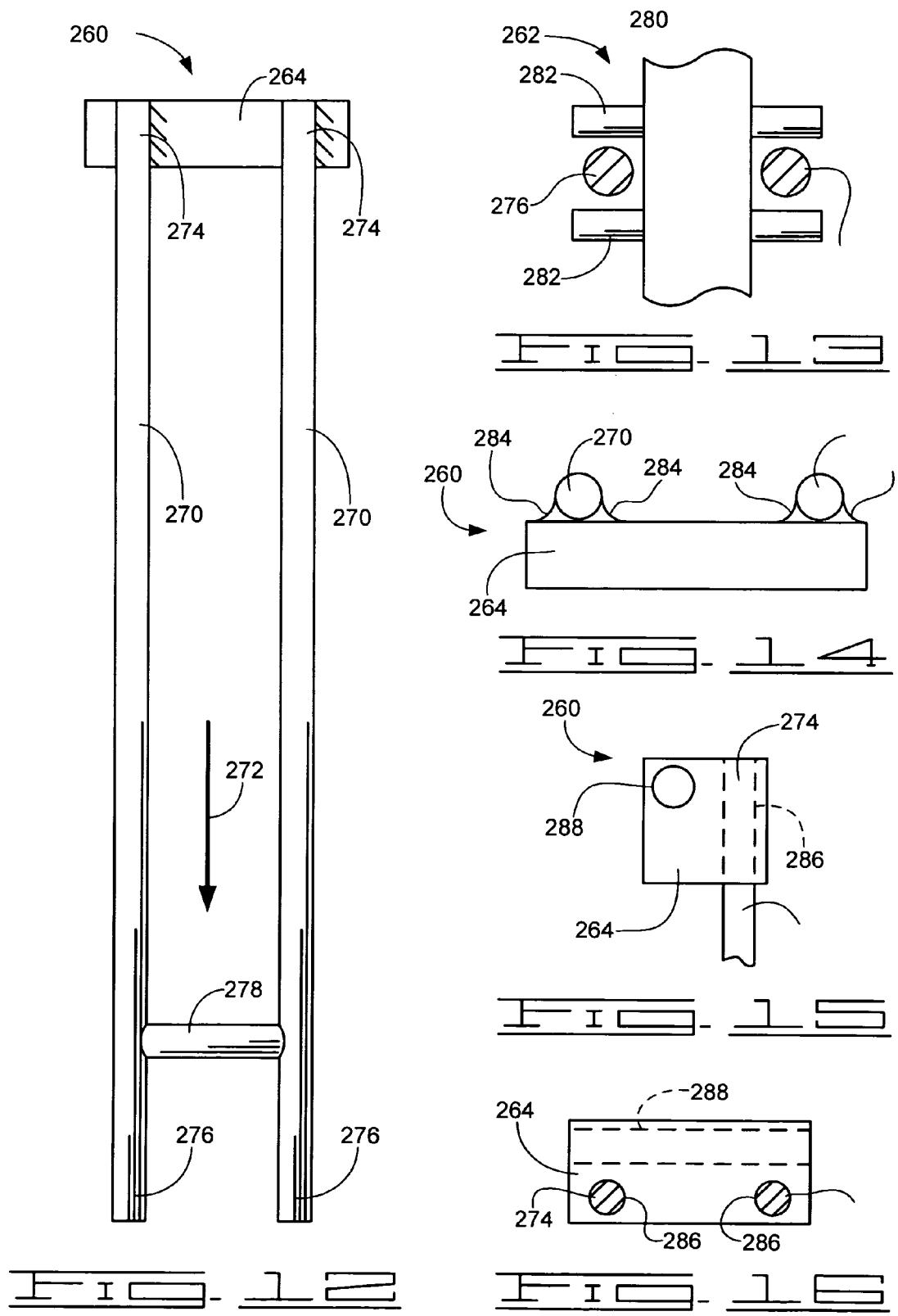

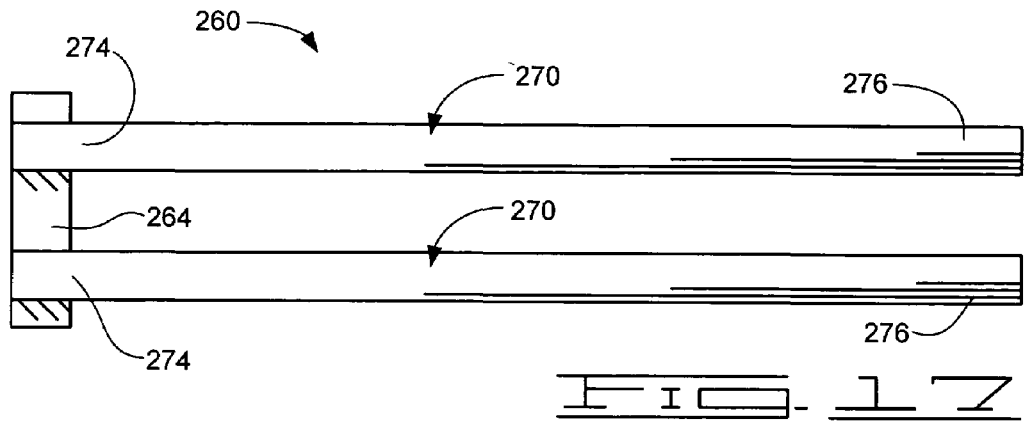
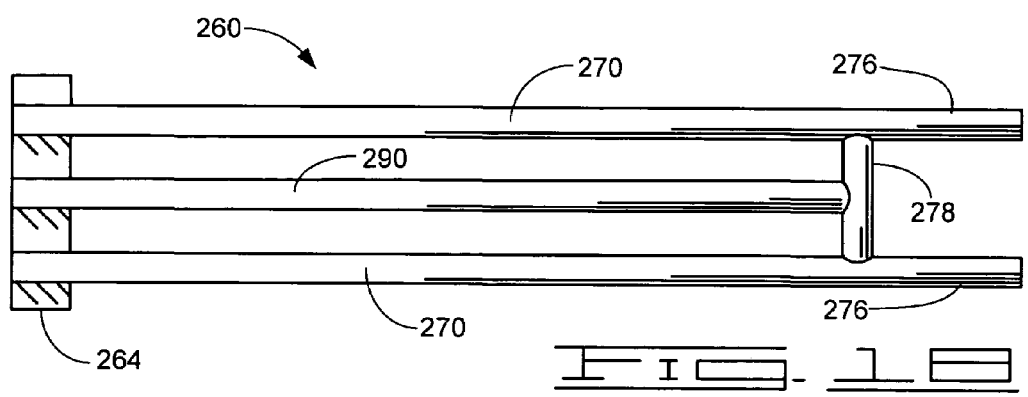
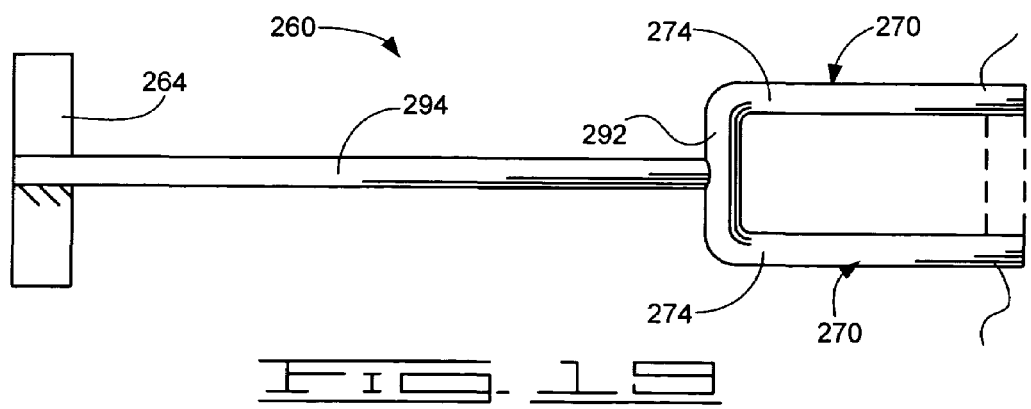

SPRING ASSEMBLY WITH CANTILEVERED SPRING RODS

RELATED APPLICATIONS

The present application is a continuation-in-part of U.S. patent application Ser. No. 10/741,614 filed Dec. 19, 2003, now U.S. Pat. No. 6,889,547.

FIELD OF THE INVENTION

The claimed invention relates generally to spring assemblies and more particularly to a spring assembly which utilizes at least two cantilevered spring rods to resist movement of a linkage member, such as in the environment of a liquid level indicator used to provide an indication of the amount of liquid present in a vessel.

BACKGROUND

It is common to collect liquids in storage vessels. Such liquids can include oil and other hydrocarbon based fluids, water (fresh or brine), hazardous chemicals, and the like. Vessels can be buried underground such as underground fuel storage tanks used in automotive service stations, or located above ground such as storage tanks used in association with drilling and refining operations in the oil and gas industry. Vessels can be pressurized or vented to the surrounding atmosphere depending upon the volatility and hazards (if any) associated with the collected liquid.

It is often advantageous to monitor the level of liquid present in a vessel. This prevents overfilling as well as indicates when the vessel is approaching an empty condition, allowing additional liquid to be added to the vessel to prevent an interruption in the ability to draw liquid therefrom.

A variety of liquid level indicators have been proposed in the art. An externally mounted liquid level indicator is disclosed in U.S. Pat. No. 3,358,098 issued to Hill. This reference mounts the indicator near the bottom of and through an outer wall of a storage tank to receive hydrostatic pressure from a column of liquid housed within the tank. This pressure is transmitted through a sealing diaphragm to a piston which, in turn, operates a pivotal pointer to provide a relative indication of the height of the column of liquid.

A submerged liquid level indicator is exemplified by U.S. Pat. No. 4,373,388 issued to Kitamura et al. This reference provides a housing with a transversely arranged diaphragm which divides the housing into opposing chambers. The housing is submerged at the bottom of the vessel so that a portion of the liquid enters the lower chamber, while the upper chamber is vented to the external atmosphere. A pressure transducer measures the resulting deflection of the diaphragm to indicate the level of liquid in the vessel.

While these and other prior art approaches may have been found operable, there nevertheless remains a need for continued improvements in the manner in which the level of liquid in a storage vessel can be measured, and it is to these and other improvements that the present invention is generally directed.

SUMMARY OF THE INVENTION

As embodied herein and as claimed below, the present invention is generally directed to an improved spring assembly for resisting movement of a linkage member, such as in a liquid level indicator used to provide an indication of the amount of liquid present in a vessel.

In accordance with preferred embodiments, the spring assembly generally comprises a base block configured to be rigidly fixed to a frame. A pair of nominally identical spring rods is cantilevered from the base block in a first direction. Each rod has a length, a proximal end rigidly fixed to the base and a free distal end. The distal ends are configured to engage a linkage member to resist movement of the linkage member by axial deflection of said rods away from the first direction.

Preferably, a cross-member is connected between the spring rods adjacent the respective distal ends to form a substantially h-shaped configuration. A third spring rod is further preferably provided in some embodiments which extend from the base block in the first direction between the pair of rods. The spring rods are each preferably characterized as substantially cylindrical in shape and formed from steel or other suitable spring material.

A fulcrum is additionally preferably provided to rigidly couple an intermediary portion of the spring assembly to the frame at a point between the base block and the respective distal ends, the fulcrum operating to increase the extent to which the distal ends resist said movement of the linkage member. The spring assembly is preferably incorporated into a liquid level indicator to resist an input force from a column of liquid to provide an indication of a height of said column.

The spring assembly is easily manufacturable and can readily be configured for a number of different applications and spring force ranges by varying the length, diameter and number of spring rods utilized. Further adjustability is supplied through use of the aforedescribed fulcrum. The spring assembly provides significantly improved linear resistive force response as compared to conventional, solid rectilinear bar springs.

These and various other features and advantages which characterize the claimed invention will become apparent upon reading the following detailed description and upon reviewing the associated drawings.

BRIEF DESCRIPTION OF THE DRAWINGS

FIG. 3 is an elevational, cross-sectional view of a liquid level input assembly from FIG. 2 in accordance with a preferred embodiment.

FIG. 4 shows relevant portions of FIG. 3 in greater detail.

FIG. 5 shows an alternative liquid storage system, with the system of FIG. 5 comprising a pressurized system that is closed to the surrounding atmosphere.

FIG. 6 shows an elevational, cross-sectional view of a liquid level input assembly from FIG. 5 in accordance with a preferred embodiment.

FIG. 10 is a functional block diagram of another embodiment of the leak indicating member which incorporates the use of an electronic sensor.

FIG. 12 provides an elevational view of the spring assembly of FIG. 11.

FIG. 13 depicts the manner in which the spring assembly of FIG. 12 interacts with the linkage member of FIG. 11.

FIG. 14 illustrates a preferred methodology for attaching the spring rods to the base block of the spring assembly through the use of welding.

FIGS. 15 and 16 illustrate an alternative preferred attachment methodology wherein the spring rods are pressed into apertures in the base block.

FIG. 17 provides an alternative embodiment to that shown in FIG. 12 in which the cross-member of FIG. 12 is omitted.

FIG. 18 provides another alternative embodiment for the spring assembly which incorporates a third spring member.

FIG. 19 provides another alternative embodiment for the spring assembly wherein the spring rods depend from an intermediate support which in turn is coupled to the base block via a single rod member.

DETAILED DESCRIPTION

Figure 1:
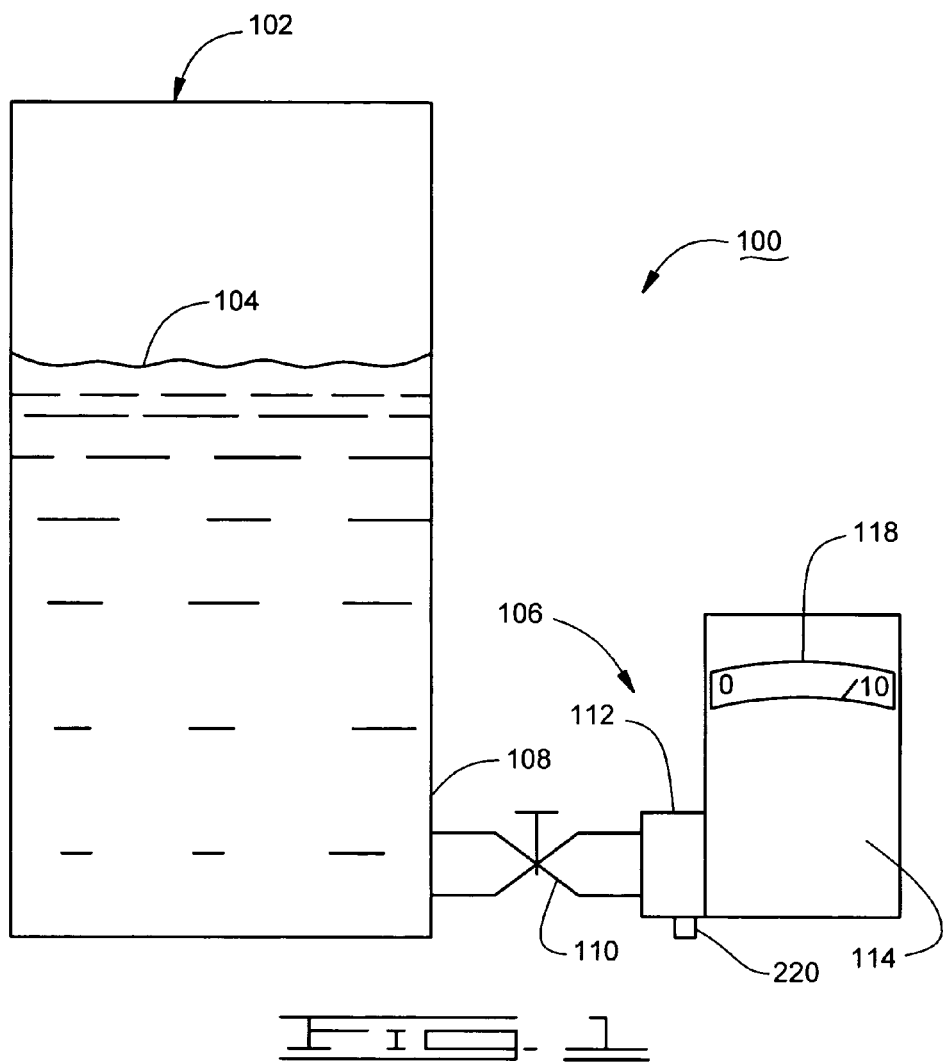
FIG. 1 is a schematic depiction of a liquid storage system constructed in accordance with preferred embodiments of the present invention, with the system of FIG. 1 being vented to the surrounding atmosphere.
Figure 1D:
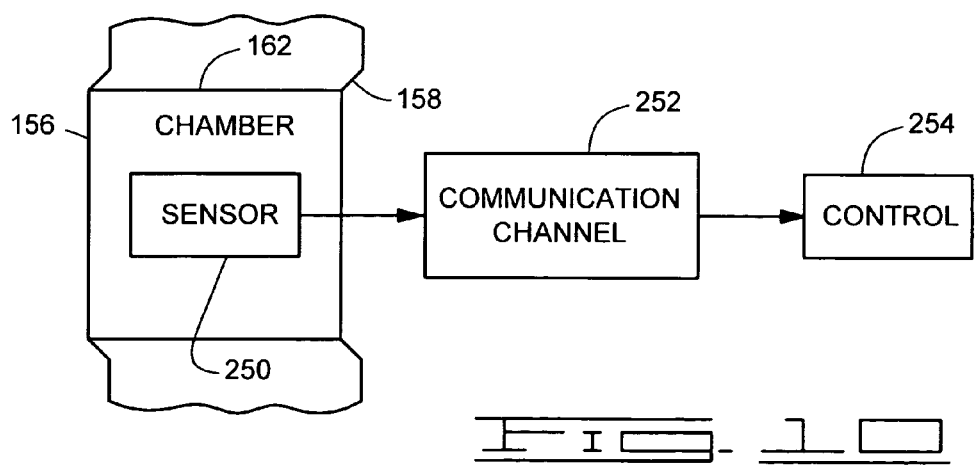

FIG. 1 depicts a liquid storage system 100 constructed in accordance with preferred embodiments of the present invention. A vessel 102 (storage tank) stores a column of liquid 104.

For purposes of providing a concrete example, the liquid is contemplated as comprising brine water and the storage tank 102 is an above-ground tank that is vented to the atmosphere, although such characterizations of FIG. 1 are not limiting. It is further contemplated that the amount of liquid 104 within the storage tank 102 varies over time due to the introduction of additional liquid into the tank and the drawing of liquid from the tank, as required.

A liquid level indicator 106 provides an indication of the level of liquid within the storage tank 102. The liquid level indicator 106 is coupled to an outer wall 108 of the storage tank 102 near ground level to receive hydrostatic pressure from the column of liquid 104 via an opening (not shown) in the side wall 108.

The indicator 106 generally includes a valve 110, a liquid level input assembly 112 and a liquid level measurement assembly 114. The valve 110 is normally open to allow the liquid level to be continuously monitored, and is closed from time to time to facilitate servicing or maintenance operations upon the input and measurement assemblies 112, 114.

Figure 2:
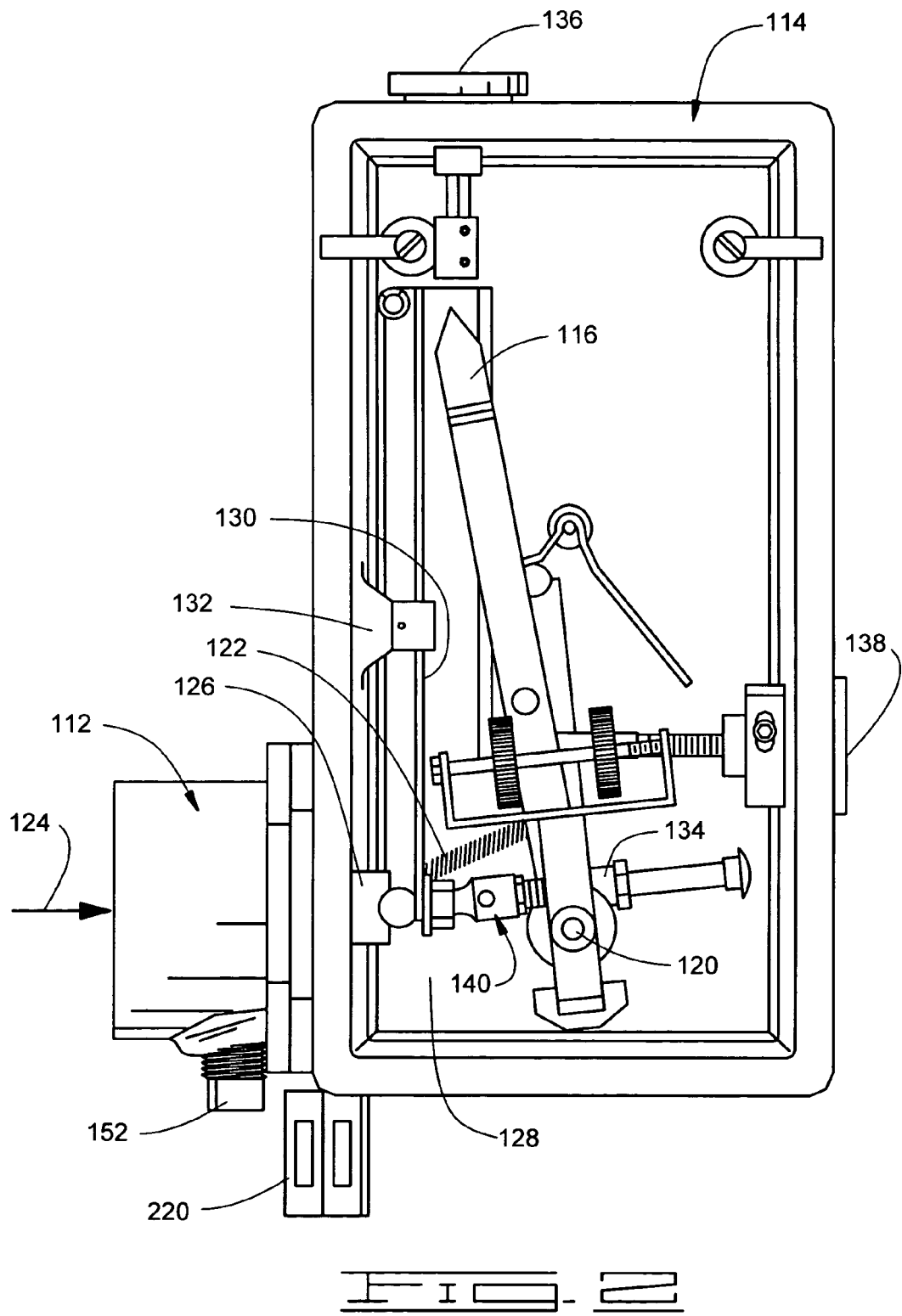
FIG. 2 provides an elevational view of a liquid level indicator from the system of FIG. 1.

FIG. 2 provides an elevational view of the input and measurement assemblies 112, 114 of FIG. 1 in accordance with a preferred embodiment. For reference, a front cover plate of the measurement assembly 114 has been removed in FIG. 2 to reveal selected components of interest.

The measurement assembly 114 has a construction that is generally similar to that disclosed in the aforementioned U.S. Pat. No. 3,358,098 Hill reference, except as noted below. Since any number of different measurement assemblies are known and can be utilized in addition to that represented in FIG. 2, a brief overview of the measurement assembly 114 will be sufficient for purposes of the present discussion.

Generally, the measurement assembly 114 provides a relative indication of the height of the column of liquid 104 using a pointer 116 which sweeps across a graduated dial (removed from FIG. 2 for clarity but depicted at 118 in FIG. 1). The dial preferably reads from zero (0) to ten (10), representative of a normalized range from 0% (empty) to 100% (full). The pointer 116 pivots about a pivot shaft 120. A zeroing spring 122 nominally biases the pointer 116 to the 0% (empty) position.

While preferred internal configurations of the liquid level input assembly 112 will be discussed below, at this point it will be noted that the column of liquid 104 from the storage tank 102 provides an input force (denoted by vector 124) that translates into lateral movement of a yoke 126 toward the measurement assembly 114. The yoke 126 supports a roller 128 that bears against a vertically aligned leaf spring 130 (bar spring), which opposes said lateral movement.

The strength of the leaf spring 130 generally establishes the overall range of the normalized readout provided by the pointer 116 and dial 118. An adjustable fulcrum for the leaf spring 130 is shown at 132. As the distal end of the leaf spring 130 deflects, a linkage 134 advances the pointer 116 to the right, thereby sweeping the pointer past the dial 118 (FIG. 1). Adjustment mechanisms 136 and 138 set the zero and maximum ranges of movement for the pointer 116.

One improvement incorporated into the measurement assembly 114 over that shown in the Hill reference is a universal joint 140 (ball and socket) between the linkage 132 and the distal end of the leaf spring 130. This translates the lateral movement of the yoke 126 to the elliptical movement of the linkage 132 as it drives the pointer 116 about the pivot shaft 120, thereby providing the pointer 116 with more uniform and accurate movement with respect to the graduations on the dial 118.

FIG. 3 illustrates the liquid level input assembly 112 of FIG. 2 in accordance with a first preferred embodiment. The input assembly 112 includes a housing 144 with central orifice 146 and threaded inlet port 148. A port 150 communicates with the orifice 146 and is engaged by a threaded drain plug 152. The drain plug 152 is removed after the shut off valve 110 (FIG. 1) is closed to drain fluid downstream from the valve during servicing or maintenance operations. Draining the downstream fluid also allows a zero level reference to be established during field calibration.

An end cap 154 mates with the housing 144 to capture the circumferential edge of a flexible first sealing member 156. The first sealing member 156 is preferably characterized as a diaphragm comprising a substantially planar layer of rubber or similar suitable material which spans the orifice 146. However, other configurations for the first sealing member can readily be employed as desired including a sealing ring, a flexible disk, etc.

The input assembly 112 further employs a flexible second sealing member 158 which also spans the orifice 146. The second sealing member 158 is likewise preferably characterized as a diaphragm and is nominally identical to the diaphragm 156, although the second sealing member can also take different configurations as desired.

The second sealing member 158 is secured along its circumferential edge by compression of the input assembly 112 against the measurement assembly 114 via a plurality of fasteners (not shown) which are inserted into a corresponding number of suitably sized, commonly aligned apertures through the housing 144 and end cap 154 (one such aperture is denoted at 160). The second sealing member 158 is separated from the first sealing member 156 by a selected lateral distance to form an enclosed chamber 162 therebetween.

A plunger assembly is generally denoted at 164. The plunger assembly 164 comprises a first plunger 166 having a disc-shaped piston member 168 which contactingly abuts the first sealing member 156 on a side opposite the inlet port 148. The plunger assembly 164 further comprises a second plunger 170 which similarly includes a disc-shaped piston member 172 that contactingly abuts the second sealing member 158 on a side opposite the inlet port 148. Portions of the first sealing member 156 and the piston member 168 are shown in greater detail in FIG. 4.

The first and second plungers 166, 170 are rigidly coupled together using an internal threaded fastener 174 (set screw), which passes through a central aperture (not designated) in the second sealing member 158. It will be noted that the first plunger is disposed within the enclosed chamber 162, and the second plunger 170 terminates in the aforedescribed yoke 126 of FIG. 2. FIG. 3 further shows the end cap 154 to incorporate a threaded port 176 which communicates with the enclosed chamber 162. The port 176 accommodates the use of a leak indicating member as discussed below.

At this point it will now be observed that, with reference to FIGS. 1–3, the hydrostatic pressure of the column of liquid 104 from the storage vessel 102 will impinge upon the first sealing member 156 to provide an input force (vector 124) that results in lateral movement of the plunger assembly 164 in relation to the height of the column of liquid. This lateral movement translates into the pivotal movement of the pointer 116 as hereinabove described to provide an indication of the level of liquid 104 in the tank 102.

FIG. 5 provides another liquid storage system 180 generally similar to the system 100 of FIG. 1. The system 180 utilizes an above-ground, pressurized storage vessel 182 (storage tank) that is closed to the surrounding atmosphere to store a column of fluid 184. For reference, the liquid 184 is contemplated as comprising a hydrocarbon based fluid although such is not limiting.

A liquid level indicator 186 operates to provide an indication of the level of liquid within the vessel 182. The liquid level indicator 186 includes the shut off valve 110 and measurement assembly 114 of FIG. 1, as well as a liquid level input assembly 188 the details of which are shown in FIG. 6.

The input assembly 188 comprises a housing 190 with a central orifice 192, an inlet port 194, a drain port 196 and a drain plug 198. An end cap 200 engages the housing 190 and compressively secures a circumferential edge of a flexible first sealing member 202. The sealing member 202 in FIG. 6 is preferably identical to the diaphragm sealing member 156 in FIG. 3.

A plunger assembly 204 includes a piston member 206 which contactingly abuts the first sealing member 202 opposite the inlet port 194. An elongated shaft 208 extends from the piston member 206, through the end cap 200 and terminates with the aforementioned yoke 126. The shaft 208 further extends through a flexible second sealing member 210, preferably characterized as a sealing ring. The sealing ring 210 is shown to have a conventional elastomeric o-ring construction, but other configurations including a rectangular cross-sectional shape can be readily employed. As with the embodiment of FIG. 3, the input assembly 188 in FIG. 6 has the first and second sealing members 202, 210 separated by a selected distance to define an enclosed chamber 212 therebetween. A sensor port 214 communicates with the chamber 212 as before.

With reference again to FIG. 5, it will be noted that because the storage tank 182 is closed to the surrounding atmosphere, a vapor space 216 will form in the tank above the liquid 184. This vapor space 216 will nominally achieve an equilibrium pressure in relation to a number of factors including the type and volume of liquid 184, the ambient temperature, etc.

The hydrostatic pressure upon the first sealing member 202 in FIG. 6 will generally arise from a combination of the weight of the column of liquid 184 and the pressure of the vapor space 216. The pressure component provided by the weight of the column will typically be substantially greater than the pressure component provided by the vapor space 216, but the vapor space pressure can nevertheless introduce significant error in the determined liquid level.

To compensate for the vapor space pressure, the input assembly 188 in FIG. 6 is further provided with a second port 218 in communication with the enclosed chamber 212. The second port 218 allows a conduit 220 to connect the enclosed chamber 212 with the vapor space 216.

In this way, the enclosed chamber 212 is nominally maintained at the same pressure as the vapor space 216. The net input force upon the first sealing member and the plunger assembly 204 is thus nominally provided in relation to the height of the column of liquid 184, allowing an accurate determination of said height in relation to the lateral movement of the yoke 126.

While effectively compensating for widely varying vapor space pressures, those skilled in the art upon a review of FIG. 6 will recognize that a small amount of error will nevertheless tend to remain in the measurement determination as a result of the vapor space pressure. This is because the plunger assembly 204 is not completely balanced; the attachment of the shaft 208 to the piston member 206 results in the surface area of the piston member 206 on the side facing the enclosed chamber 212 being slightly less than the surface area of the piston member 206 on the side facing the first sealing member 202.

This means that the force upon the piston member 206 in a direction toward the inlet 194 as a result the pressure of the vapor space 216 will be almost, but not quite, equal to the input force component upon the piston member 206 in the opposite direction caused by the vapor space pressure. Nevertheless, this error can be maintained at an acceptably low level provided the cross-sectional area of the shaft 208 is configured to be substantially smaller than the cross-sectional area of the piston member 206.

Figure 7:
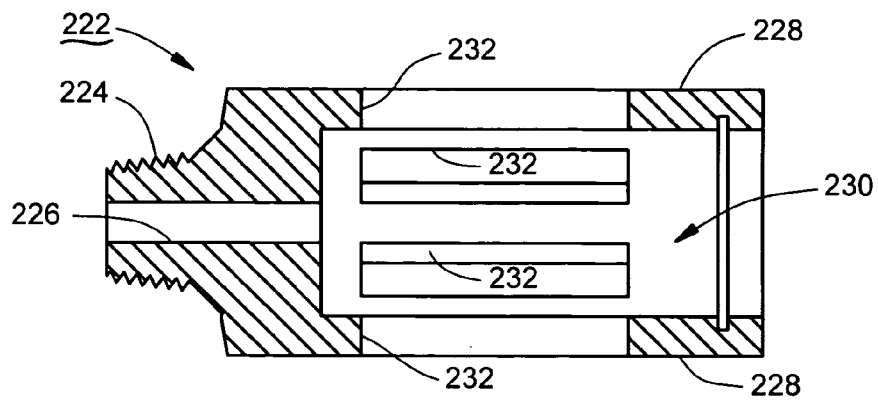
FIG. 7 is an elevational, cross-sectional view of a housing of a leak indicating member preferably used in conjunction with the liquid level input assemblies of FIGS. 3 and 6.
Figure 8:
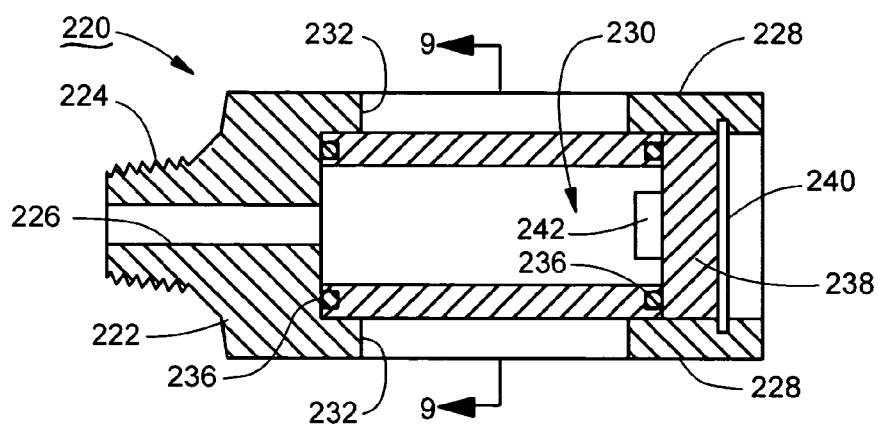
FIG. 8 is an elevational, cross-sectional view of the leak indicating member including the housing of FIG. 7 as well as a translucent acrylic tube supported therein.
Figure 9:
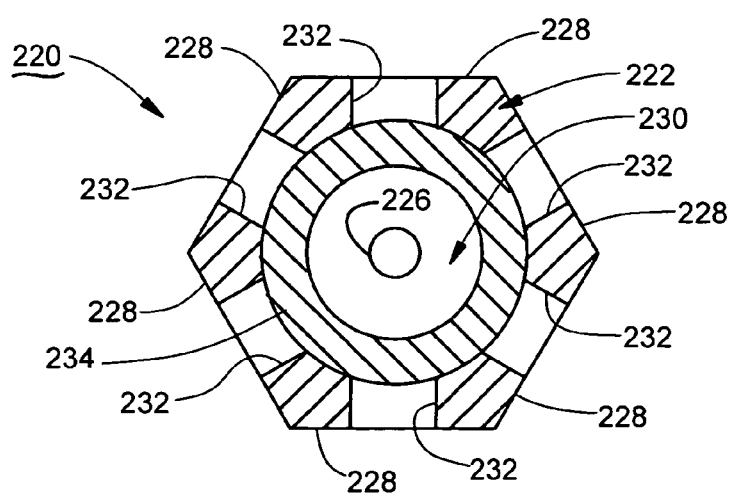
FIG. 9 provides an end view of the leak indicating member as viewed along line 9—9 in FIG. 8.

Reference is now made to FIGS. 7–9 which provide various details with respect to the aforementioned leak indicating member, herein denoted numerically at 220. The leak indicating member 220 preferably includes a housing 222 as shown in FIG. 7. The housing 222 is substantially "bottle" shaped and includes a threaded end 224 with inlet orifice 226 to engage the ports 174, 214 in FIGS. 3 and 6, respectively. For reference, FIG. 2 shows an elevational view of the leak indicating member 220 upon installation into the input assembly 112.

The housing 222 is preferably hexagonal in cross sectional shape so as to have a number of angularly arrayed face surfaces 228 (best viewed in FIG. 9) which surround a central orifice 230 of the housing. The central orifice 230 lies in communication with the inlet orifice 226.

Rectangular apertures 232 are formed through each of the respective face surfaces 228. This allows ready visual access to a transparent tube 234 inserted into the central orifice 230 as shown in FIG. 8. The tube 234 preferably comprises an acrylic tube with embedded, circumferentially extending sealing ring seals 236 at each end. An end cap 238 and snap retaining ring 240 retain the tube 234 in place.

The housing 222, tube 234 and end cap 238 cooperate to form a liquid tight receptacle configured to collect any liquid that enters the enclosed chambers 162, 212 of FIGS. 3, 6. In this way, a leak through the first sealing members 156, 202 caused by a puncture, tear, defect, fatigue, etc. can be readily identified by observing the presence of liquid through the transparent windows formed by the apertures 232 and tube 234.

A suitable colored dye (such as represented by pellet 242) can further be placed within the receptacle. In this way, a substantially clear liquid can be provided with a more easily discernable color (e.g., red, blue) to indicate the presence of a leak.

At the same time, such leak will generally not impact the ability of the measurement assembly 114 to continue to operate to detect the level of the liquid within the storage tank 102, 182. This is because the second sealing member (158 in FIG. 3 and 210 in FIG. 6) will nominally operate to prevent passage of the liquid 104, 184 into the housing of the measurement assembly 114 or otherwise out into the surrounding environment. Thus, failed sealing members can be readily identified and maintenance operations can be scheduled to replace such before a catastrophic leak occurs.

The leak indicating member 220 of FIGS. 7–9 generally relies upon visual inspection by a human observer to detect the presence of a leak through the first sealing member. FIG. 10 provides an alternative embodiment for a leak indicating member comprising an electrical sensor 250. The sensor 250 is contemplated as being disposed within the enclosed chamber 162 of FIG. 3 (i.e., between the first and second sealing members 156, 158).

The sensor 250 can take any number of forms, such as a low voltage continuity device with a pair of spaced apart terminals which outputs a signal as a result of a change in impedance (resistance, capacitance, etc) caused by the presence of leaked fluid between the terminals. The sensor 250 communicates over a communication channel 252 (which can be a hardwired cable connection, a wireless transmission network, etc.) to a control unit 254 at a remote location.

The control unit 254 can comprise a personal computer (PC) or similar equipment with suitable programming to alert a user of the presence of the detected fluid. As desired, the same communication channel can further be used to communicate liquid level measurements from the measurement assembly 114 as well as any other relevant data to the user.

It will now be recognized that the input assembly 112 provides certain notable advantages over the prior art. The use of first and second sealing members (such as 156, 158 in FIG. 3 and 202, 210 in FIG. 6) advantageously prevents catastrophic failures due to leaks that may arise from time to time through such sealing members.

At the same time, the use of the leak indicating member (such as 220, 250) allows the ready identification of the failure of the first sealing member, enabling maintenance personnel to schedule appropriate servicing operations at times when the liquid level indicator can be conveniently taken off line.

The liquid level indicator can also accommodate a wide variety of different types of storage systems, including above ground and underground tanks as well as both pressurized and vented tanks. The input assembly can be externally mounted to the outside wall of a storage vessel as exemplified herein, and can also be readily adapted for use in a submerged system (i.e., within the tank at the bottom of the fluid). Indeed, the high reliability and accuracy afforded by the embodiments disclosed herein readily facilitate use in any number of different environments and systems, depending upon the requirements of a given application.

Figure 11:
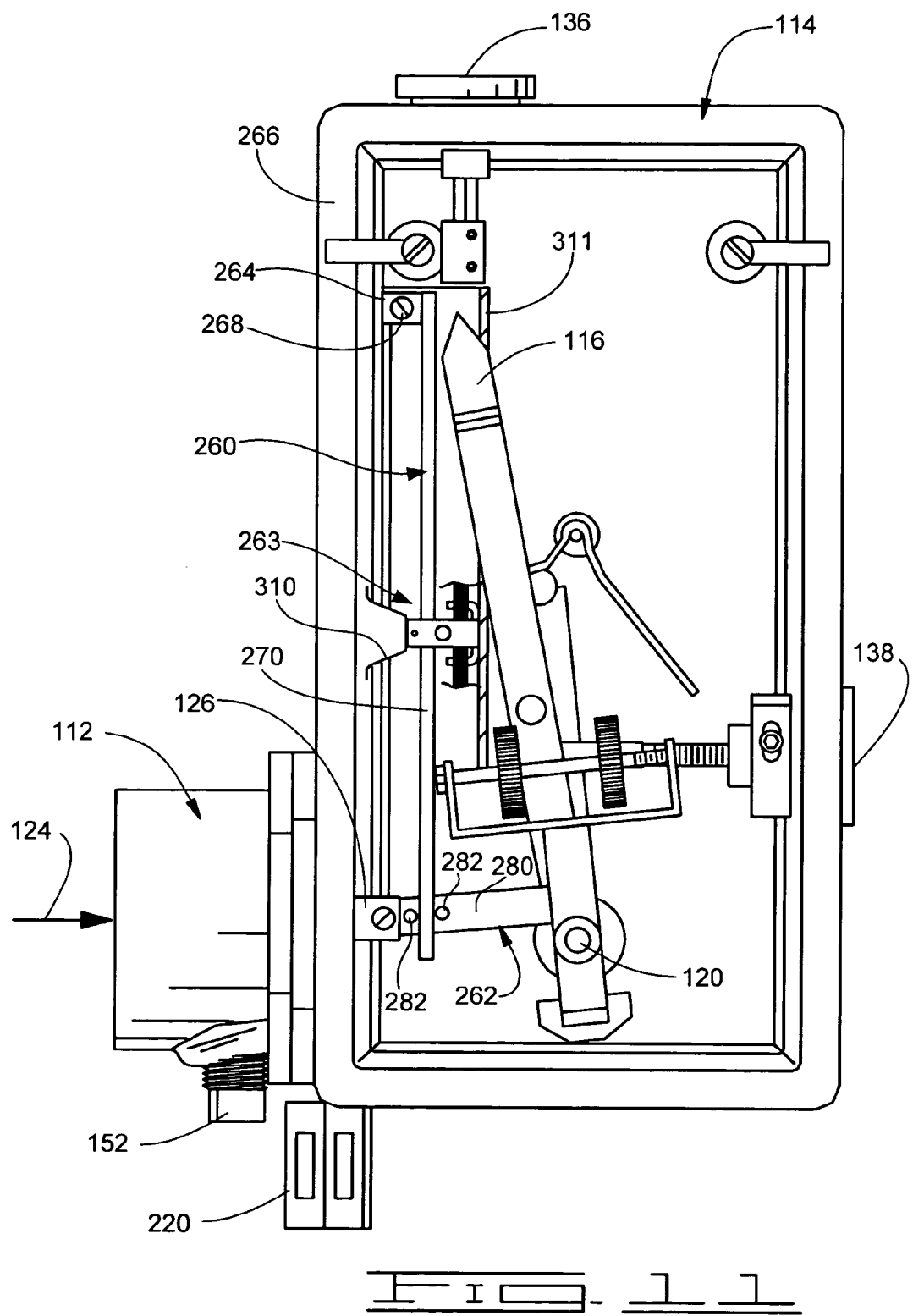
FIG. 11 provides another preferred embodiment for the liquid level indicator of FIG. 2, with the embodiment of FIG. 11 utilizing an improved spring assembly.

FIG. 11 provides an elevational depiction of the liquid level indicator 114 in accordance with another preferred embodiment. The liquid level indicator 114 as shown in FIG. 11 is generally similar to that previously depicted in FIG. 2 except as noted below. Accordingly, like reference numerals will be used for similar components in both drawings.

The indicator as set forth in FIG. 11 utilizes an improved spring assembly 260, which has been substituted for the leaf spring (rectilinear bar spring) 130. The spring assembly 260 engages a linkage member 262 so that, as before, the input force supplied by the height of the column of liquid is translated through the input assembly 112 to impart movement to the linkage member 262. Such movement is resisted by the spring assembly 260, and translates into deflection of the pointer 116 to provide a human readable indication of the height of the column.

It has been found that the spring assembly 260 provides a more linear resistive force response over a greater range as compared to the leaf spring 130, resulting in higher accuracy measurements by the indicator 114. A moveable fulcrum 263 adapted for the spring assembly 260 is shown in place of the fulcrum 132 of FIG. 2, and will be discussed in greater detail below.

A plan view of the spring assembly 260 is provided in FIG. 12. The spring assembly 260 preferably comprises a base block 264 which, as shown in FIG. 11, is rigidly affixed to a housing (frame) 266 of the indicator 114 via fastener 268.

A pair of nominally identical spring rods 270 is cantilevered from the base block 264 in a first direction (denoted by arrow 272). The spring rods 270 are preferably cylindrical in shape and formed from steel or other suitable spring material. A proximal end 274 of each rod 270 is affixed to the base block 264 and a distal end 276 of each rod 270 is free (i.e., solely supported by the base block 264). An optional cross-member 278 adjoins the respective rods 270 as shown to provide a substantially h-shaped configuration.

The distal ends 276 engage the linkage member 262 as depicted in FIG. 13. Preferably, the rods 270 straddle a body portion 280 of the linkage member 262 and are captured by pins 282 that pass through or otherwise extend from the body portion 280.

In this way, lateral movement of the body portion 280 causes the distal ends 276 to engage the pins 282 and resist movement of the linkage member 262 by axial deflection of the rods away from the first direction 272. It will be recognized that other linkage configurations besides that shown in FIGS. 11, 13 can readily be used as desired.

Preferably, the spring rods 270 are affixed to the base block 264 via welding, as shown by weld joints 284 in FIG. 14. Alternatively, the spring rods 270 can be press-fit into corresponding apertures 286 through the base block 264, as depicted in FIGS. 15 and 16. A fastener aperture 288 extends through the base block 260 to accommodate the aforementioned fastener 268.

FIG. 17 provides an alternative embodiment for the spring assembly 260 in which relatively larger diameter rods 270 are utilized. It will be recognized that different spring rate ranges can readily be obtained by varying the length, diameter and spring material composition of the rods 270. It is contemplated that the cross-member (278 in FIG. 12) can be omitted as desired, particularly when larger diameter rods are used.

FIG. 18 provides another alternative embodiment for the spring assembly 260 that is similar to that shown in FIG. 12 except that a third spring rod 290 has been added to extend from the base block 264 to the cross-member 278. This increases the overall spring force while maintaining clearance for the linkage assembly 262.

FIG. 19 provides another alternative embodiment in which the spring rods 270 are supported by an intermediate support 292, which in turn is affixed to the base block 264 via a rod member 294 to provide a substantially y-shaped (tuning fork) configuration. As before, clearance is provided between the rods 270 for the linkage member 262. The embodiment of FIG. 19 is particularly suitable for relatively lower spring force range applications. An optional cross-member (shown in broken line at 298) can further be provided as desired.

Figure 20:
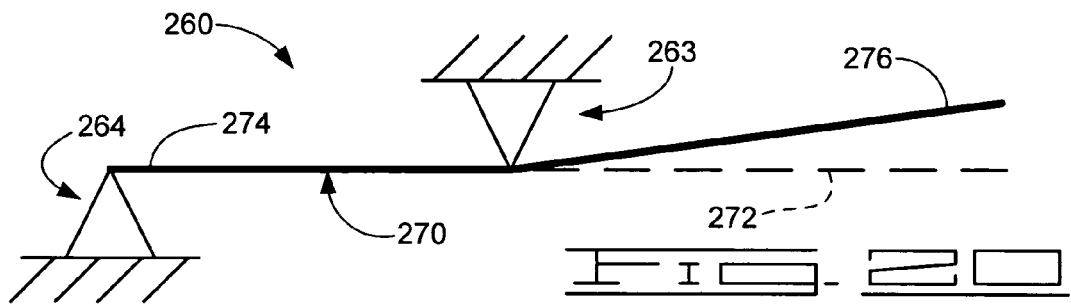
FIG. 20 is a schematic depiction of the spring assembly to generally illustrate axial deflection of the spring rods in conjunction with the use of the fulcrum from FIG. 11.

FIG. 20 provides a schematic representation of the spring assembly 260 as utilized in the indicator 114 of FIG. 11. The rigid support supplied to the spring rods 270 by the base block 264 and the fulcrum 263 results in the portions of the rods 270 therebetween to be maintained along the first direction 272. The linkage member 262 thus deflects the remaining portions of the rods 270 beyond the fulcrum 263 away from the axial direction 272.

Adjustment of the distance between the fulcrum 263 and the base block 264 results in a lengthening or shortening of the effective length of the spring rods, and thus permits the range of force response of the spring assembly 260 to be set at a desired range.

It will be noted that the engagement of the spring rods 270 on opposing sides of the central axis of the assembly 260 (i.e., along arrow 272 in FIG. 12) will tend to reduce undesired torsional (rotational) or skewed deflection of the spring assembly and better ensures linear movement of the linkage member in an orthogonal direction to the spring assembly 260.

Figure 21:
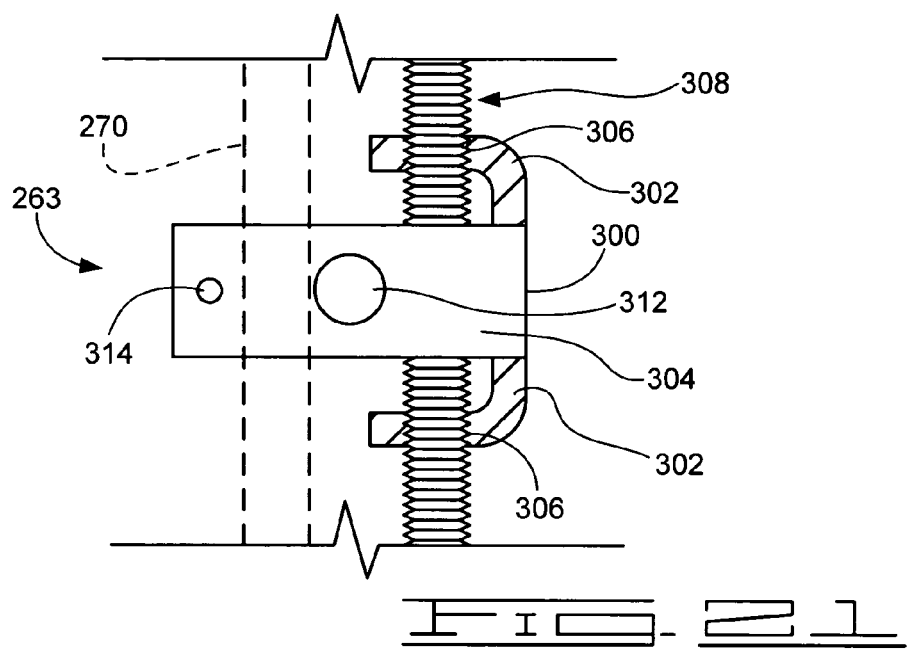
FIG. 21 provides an elevational view of the fulcrum from FIG. 11.
Figure 22:
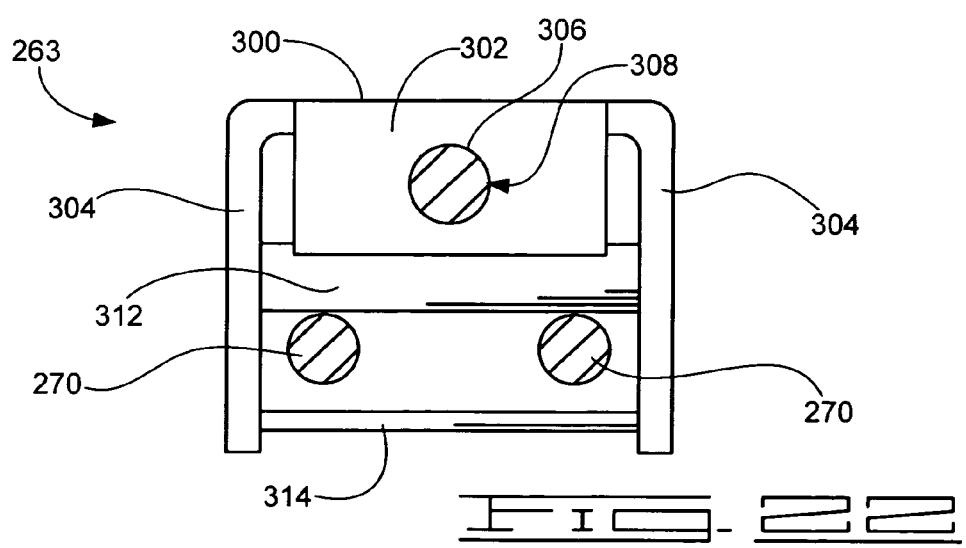
FIG. 22 provides a top plan view of the fulcrum of FIG. 21.

FIGS. 21 and 22 show a preferred construction for the fulcrum 263 in greater detail. The fulcrum 263 includes a base plate 300 which supports cantilevered, opposing top and bottom flanges 302 (best viewed in FIG. 21) and cantilevered, opposing side flanges 304 (best viewed in FIG. 22). The top and bottom flanges 302 each include a threaded aperture 306 to engage an elongated, threaded bolt 308.

Rotational adjustment of the bolt 308 causes the fulcrum 263 to move along the length of the bolt 308, thus adjusting the distance of the fulcrum 263 to the base block 264 as discussed above. A support assembly 310 (shown in FIG. 11) slides along a surface (not numerically designated) of the housing 266 as the elevation of the fulcrum 263 is adjusted to support and maintain the desired rotational orientation of the fulcrum 263 with respect to the spring assembly 260.

A transverse pivot pin 312 is supported by the side flanges 304 in close proximity to the spring rods 270. The pivot pin 312 serves as a pivot point for the spring rods 270; as the linkage member 262 is moved to the right in FIG. 11, the spring rods 270 are moved over into contacting abutment with the pin 312, which fixes the rods 270 above the pin and allows deflection of the rods below the pin 312 starting at this pivot point.

A smaller diameter retention pin 314 provides additional support to the side flanges 304. While in the illustrated embodiments the spring rods 270 will not normally contact and bear against the retention pin 314 as with the pivot pin 312, in alternative embodiments the retention pin 314 can be configured as the pivot pin 312 so that pivot points are provided by the fulcrum 263 in opposing directions.

While the liquid level indicator 114 has been disclosed as the preferred environment for the spring assembly 260, it will be readily apparent that such is not necessarily limiting. Rather, the spring assembly 260 (as disclosed herein and as claimed below) can be utilized in any number of applications where linear deflection, as opposed to torsional deflection, is desired.

It will now be recognized that the present invention is generally directed to a spring assembly (such as 260) and an apparatus incorporating the same such as, but not limited to, a liquid level indicator (such as 114). In accordance with preferred embodiments, the spring assembly includes a base block (such as 264) configured to be rigidly fixed to a frame (such as 266).

A pair of nominally identical spring rods (such as 270) is cantilevered from the base block in a first direction (such as 272). Each rod has a length, a proximal end (such as 274) rigidly fixed to the base and a free distal end (such as 276), said distal ends configured to engage a linkage member (such as 262) to resist movement of the linkage member by axial deflection of said rods away from the first direction.

Preferably, the spring assembly further comprises a cross-member (such as 278, 298) connected between the respective spring rods adjacent the respective distal ends. In some embodiments, the spring rods are characterized as first and second spring rods, and wherein the spring assembly further comprises a third elongated spring rod (such as 290) extending from the base in the first direction and disposed between the first and second spring rods. In other embodiments, the respective proximal ends of the spring rods extend from an intermediate support (such as 292), and wherein the spring assembly further comprises a rod (such as 294) with a proximal end affixed to the base and a distal end affixed to the intermediate support.

Preferably, a fulcrum (such as 132) rigidly couples an intermediary portion of the spring assembly to the frame at a point between the base block and the respective distal ends, the fulcrum operating to adjust the extent to which the distal ends resist said movement of the linkage member. An aperture (such as 288) preferably extends through the base block in a direction normal to the first direction to accommodate a fastener (such as 268) to rigidly affix the base block to the frame.

The disclosed spring assembly 260 of FIGS. 11–20 operates to resist movement of the linkage member 262 relative to the frame 266. Accordingly, for purposes of the appended claims, the recited first means will be understood to correspond to the disclosed spring assembly 260 as embodied in FIGS. 11–20. The disclosed leaf spring (rectilinear bar spring) 130 is expressly disclaimed as not being encompassed by this claim element and is expressly excluded as an equivalent. Moreover, structures that do not provide separate spring rods on opposing sides of a central axis of the assembly, structures that are held in tension along the length of the spring rods, and structures that provide support to the distal ends of the spring rods apart from the base block are not encompassed by this claim element and are expressly excluded as being an equivalent.

The disclosed fulcrum 263 of FIGS. 11, 20–22 is operable on the spring assembly 260 to adjust the resisting movement provided by the spring assembly 260. Accordingly, the recited second means will be understood to correspond to the disclosed fulcrum 263.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A spring assembly, comprising:
   a base block configured to be rigidly fixed to a frame; and
   a pair of nominally identical spring rods cantilevered from the base block in a first direction, each rod having a length, a proximal end rigidly fixed to the base and a free distal end, said distal ends configured to engage a linkage member to resist movement of the linkage member by axial deflection of said rods away from the first direction.

2. The spring assembly of claim 1, further comprising a cross-member connected between the respective spring rods adjacent the respective distal ends.

3. The spring assembly of claim 1, wherein the spring rods are characterized as first and second spring rods, and wherein the spring assembly further comprises a third elongated spring rod extending from the base in the first direction and disposed between the first and second spring rods.

4. The spring assembly of claim 1, wherein the respective proximal ends of the spring rods extend from an intermediate support, and wherein the spring assembly further comprises a rod with a proximal end affixed to the base and a distal end affixed to the intermediate support.

5. The spring assembly of claim 1, wherein the spring rods are each characterized as substantially cylindrical in shape.

6. The spring assembly of claim 1, wherein the spring rods are pressed into respective apertures in the base block.

7. The spring assembly of claim 1, wherein the spring rods are welded to the base block.

8. The spring assembly of claim 1, in combination with a fulcrum which rigidly couples an intermediary portion of the spring assembly to the frame at a point between the base block and the respective distal ends, the fulcrum operating to adjust the extent to which the distal ends resist said movement of the linkage member.

9. The spring assembly of claim 1, wherein the base block further comprises an aperture which extends through said block in a direction normal to the first direction to accommodate a fastener to rigidly affix the base block to the frame.

10. The spring assembly of claim 1 incorporated into a liquid level indicator wherein the spring assembly resists an input force from a column of liquid to provide an indication of a height of said column.

11. An apparatus comprising:
    a frame; and
    a spring assembly comprising a base block rigidly fixed to the frame and a pair of nominally identical spring rods cantilevered from the base block in a first direction, each rod having a length, a proximal end rigidly fixed to the base and a free distal end, said distal ends configured to engage a linkage member to resist movement of the linkage member by axial deflection of said distal ends away from the first direction while the base block retains the proximal ends in axial alignment along the first direction.

12. The apparatus of claim 11, wherein the spring assembly further comprises a cross-member connected between the respective spring rods adjacent the respective distal ends.

13. The apparatus of claim 11, wherein the spring rods are characterized as first and second spring rods, and wherein the spring assembly further comprises a third elongated spring rod extending from the base in the first direction and disposed between the first and second spring rods.

14. The apparatus of claim 11, wherein the spring rods are each characterized as substantially cylindrical in shape.

15. The apparatus of claim 11, wherein the spring rods are pressed into respective apertures in the base block.

16. The apparatus of claim 11, wherein the spring rods are welded to the base block.

17. The apparatus of claim 11, further comprising a fulcrum which rigidly couples an intermediary portion of the spring assembly to the frame at a point between the base block and the respective distal ends, the fulcrum operating to adjust the extent to which the distal ends resist said movement of the linkage member.

18. The apparatus of claim 17, wherein the fulcrum is adjustable so as to be placed at different distances from the base block to correspondingly adjust the extent to which the distal ends resist said movement of the linkage member.

19. The apparatus of claim 11 characterized as a liquid level indicator wherein the spring assembly resists an input force from a column of liquid to provide an indication of a height of said column.

* * * * *